(12) United States Patent
Washington

(10) Patent No.: US 7,548,036 B2
(45) Date of Patent: Jun. 16, 2009

(54) DC MOTOR MECHANICAL SHOCK PROTECTION SYSTEM

(75) Inventor: Rodney B. Washington, Raleigh, NC (US)

(73) Assignee: Square D Company, Palatine, IL (US)

( * ) Notice: Subject to any disclaimer, the term of this patent is extended or adjusted under 35 U.S.C. 154(b) by 1 day.

(21) Appl. No.: 11/545,346

(22) Filed: Oct. 10, 2006

(65) Prior Publication Data
US 2008/0084172 A1    Apr. 10, 2008

(51) Int. Cl.
H02P 7/00    (2006.01)

(52) U.S. Cl. .......................... 318/456; 318/15; 318/432; 318/626

(58) Field of Classification Search .................. 318/456, 318/567, 600, 611, 612, 626, 430–434, 9–15
See application file for complete search history.

(56) References Cited

U.S. PATENT DOCUMENTS

| | | | | |
|---|---|---|---|---|
| 4,270,164 A | * | 5/1981 | Wyman et al. | 363/56.03 |
| 4,553,187 A | * | 11/1985 | Burns et al. | 361/96 |
| 4,686,598 A | * | 8/1987 | Herr | 361/31 |
| 4,713,593 A | * | 12/1987 | Rodi et al. | 318/572 |
| 4,816,987 A | * | 3/1989 | Brooks et al. | 700/45 |
| 4,924,166 A | | 5/1990 | Roussel | 318/608 |
| 5,223,775 A | | 6/1993 | Mongeau | 318/432 |
| 5,432,421 A | | 7/1995 | Kessler et al. | 318/538 |
| 5,644,510 A | * | 7/1997 | Weir | 702/132 |
| 5,648,887 A | * | 7/1997 | Herndon et al. | 361/31 |
| 6,100,604 A | | 8/2000 | Morroni et al. | 307/64 |
| 6,271,709 B1 | * | 8/2001 | Kimura et al. | 327/380 |
| 6,479,958 B1 | * | 11/2002 | Thompson et al. | 318/430 |
| 6,823,134 B2 | * | 11/2004 | Glasgow et al. | 310/50 |
| 6,859,030 B2 | | 2/2005 | Otte | 324/166 |
| 2004/0145321 A1 | * | 7/2004 | Yasui et al. | 318/135 |
| 2006/0131146 A1 | | 6/2006 | Filippenko | |

OTHER PUBLICATIONS

Functional Description, Analog Integrated Circuit Device Data, Freescale Semiconductor, Jan. 2005 (31 pages).
Freescale Semiconductor Technical Data, 5.0 A H-Bridge with Load Current Feedback,: Freescale Semiconductor, Inc., No. MC33887, Rev 10.0, dated Jul. 2005, 32 pages.
"Electric Motr," http://en.wikipedia.org/wiki/Dc_motor, dated Sep. 29, 2006, 4 pages.
"The Adaptive Interference Canceler As A Notch Filter," Adaptive Signal Processing, Bernard Widrow and Samuel D. Sterns, 1985, pp. 316-323.
"Application 4: Adaptive Noise Cancelling Applied to A Sinusoidal Interference," Adaptive Filter Theory, Fourth Edition, Simon Haykin, 2002, pp. 246-252.

* cited by examiner

Primary Examiner—Bentsu Ro

(57) ABSTRACT

A DC motor mechanical shock protection system monitors the motor current to determine the torque the motor is applying to the gearbox, and takes mitigating action if the torque approaches a level that can damage the driven device and/or the drive system. This protects the system from mechanical shock without limiting the available torque during normal operation. The change in motor current is monitored to detect the inertial torque before the elasticity between the motor and the driven device is fully compressed and the motor mounting or gearbox begin to be damaged.

12 Claims, 2 Drawing Sheets

DC MOTOR MECHANICAL SHOCK PROTECTION SYSTEM

FIELD OF THE INVENTION

The present invention relates generally to the control of DC drive motors and, more particularly, to a mechanical shock protection system for DC-motor drive systems.

BACKGROUND OF THE INVENTION

A DC motor is used to drive an attached mechanical device, which is typically coupled to the motor through an intermediary gearing system such as a gearbox. If the attached device is suddenly stopped, it can produce mechanical shock that is transmitted into the driving motor and gearbox. The mechanical shock can occur when the part of the device that is in motion hits an end stop or other obstruction in the travel path.

If the mechanical shock is sufficiently strong or occurs repeatedly, the motor and gearbox can be damaged and cause the system to fail to operate. The mechanical shock can damage the motor by twisting the motor shaft or loosening or breaking the motor's mounting to the device. The mechanical shock can damage the gearbox by cracking the gears, breaking off gear teeth, or loosening or breaking the gearbox's mounting to the device.

A common solution to protect a device from this kind of mechanical shock is to pad the travel end stops with a shock absorbing material, such as rubber. This solution requires extra cost and does not protect against an unanticipated obstruction being placed maliciously or unintentionally in the travel path.

Another common solution is to strengthen the motor and gearbox materials to handle the potential shock. This solution usually adds significant cost to the manufacture of the system.

Yet another common solution is to slow the motion of the device down to the point where a sudden stop will not produce enough mechanical shock to damage the system. This solution can adversely effect the operation of the system.

SUMMARY OF THE INVENTION

In one embodiment of this invention, the torque produced by a DC motor is controlled by monitoring the motor torque produced by rotor inertia, and adjusting the electrical current supplied to the motor in response to an increase in the monitored motor torque that exceeds a preselected threshold. The adjustment of the motor current preferably stops or reverses the motor.

In one specific implementation, the torque produced by rotor inertia is monitored by monitoring the electrical current supplied to the motor, detecting increases in the monitored electrical current in selected time intervals, and comparing each of the detected increases with a preselected threshold that is significantly above increases that occur during normal operation of the motor. Increases in the monitored electrical can be detected by calculating any change that occurs in the magnitude of the motor current in each selected time interval, and determining whether each calculated change is positive.

BRIEF DESCRIPTION OF THE DRAWINGS

The invention can best be understood by reference to the following description taken in conjunction with the accompanying drawings, in which.

DETAILED DESCRIPTION OF THE ILLUSTRATED EMBODIMENT

Figure 1:
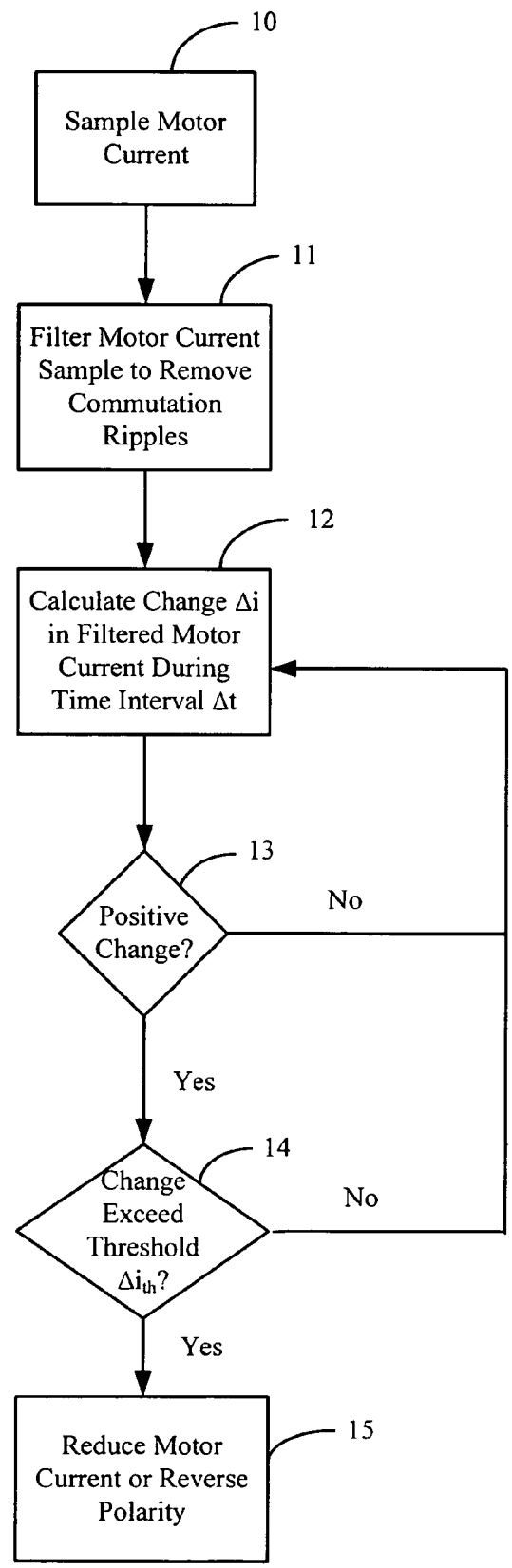
FIG. 1 is a flow chart of an algorithm carried out in one implementation of the shock protection system of the present invention.

Although the invention will be described in connection with certain preferred embodiments, it will be understood that the invention is not limited to those particular embodiments. On the contrary, the invention is intended to include all alternatives, modifications and equivalent arrangements as can be included within the spirit and scope of the invention as defined by the appended claims.

A DC motor and gearbox comprise a rotational system where a mechanical shock, linear or rotational, is translated into a change in the torque the motor is applying to a driven device via the gearbox, and to the motor mount. The mechanical shock is typically due to a sudden change in the motion of the driven device, which in turn is due to a change in the force opposing the motion.

The torque $\tau$ applied by the motor to the gearbox and the motor mount is the torque from the motor electromagnetic field $\tau_{emf}$ and the torque from the rotor inertia $\tau_{inertia}$.

$$\tau = \tau_{emf} + \tau_{inertia}$$

The torque $\tau_{emf}$ from the motor electromagnetic field is proportional to the motor current i.

$$\tau_{emf} = K_1 i$$

The torque $\tau_{inertia}$ from the rotor inertia is proportional to the change in rotor angular velocity $\omega$.

$$\tau_{inertia} = -J\frac{d\omega}{dt}$$

The current i for a DC motor is related to the terminal voltage V, the motor electrical resistance R, and the back-emf voltage $\alpha\omega$.

$$i = \frac{V - \alpha\omega}{R}$$

The change in rotor angular velocity $$\frac{d\omega}{dt}$$

for a DC motor with constant terminal voltage is proportional to the change in motor current.

$$\frac{d\omega}{dt} = -\frac{R}{\alpha}\frac{di}{dt}$$

The motor torque from the rotor inertia $\tau_{inertia}$ is proportional to the change in motor current.

$$\tau_{inertia} = K_2 \frac{di}{dt}$$

The total torque $\tau$ from the motor electromagnetic field and the rotor inertia can be described in terms of the motor current.

$$\tau = K_1 i + K_2 \frac{di}{dt}$$

If the motion of the driven device is stopped, the electromagnetic field torque $\tau_{emf}$ and the inertial torque $\tau_{inertia}$ will continue to turn the motor shaft, compressing the elasticity in the motor mounting, the gearbox and the driven device up to the point where the motion was stopped. The mechanical shock is from the inertial torque and can be significantly above the device tolerances even though the current from the electromagnetic torque is well below the locked rotor level.

In one embodiment of the present invention, a DC motor mechanical shock protection system monitors the motor current to determine the torque the motor is applying to the gearbox, and takes mitigating action if the torque approaches a level that can damage the driven device and/or the drive system. This protects the system from mechanical shock without limiting the available torque during normal operation. The change in motor current is monitored to detect the inertial torque before the elasticity between the motor and the driven device is fully compressed and the motor mounting or gearbox begin to be damaged.

FIG. 1 is a flow chart of an algorithm carried out in one embodiment of the invention. The DC motor current is sampled at step 10 and then filtered at step 11 to remove the commutation ripples caused by the brushes crossing the commutator segments. The system then calculates the change Δi that occurs in the magnitude of the motor current i during each successive time interval Δt, at step 12. Step 13 determines whether the change Δi calculated at step 12 is a positive change and, if the answer is affirmative, the system proceeds to step 14. A negative answer at step 13 causes the system to return to step 12 to calculate the magnitude of the change in current magnitude during the next time interval Δt.

Step 14 determines whether a positive change in the motor current rises above a threshold that represents inertial torque that can damage the system, i.e., to detect an incipient mechanical shock condition. The threshold is preferably significantly above the maximum normal operating level. If step 14 yields an affirmative answer, step 15 adjusts the motor current to stop or reverse the motor, to counteract the incipient shock before any damage is done to the motor or gearbox. A negative answer at step 14 causes the system to return to step 12 to calculate the the magnitude of the change in current magnitude during the next time interval Δt.

The system continues to successively calculate the change Δi, if any, in the motor current i in each successive time interval Δt. Each time a calculated change Δi is positive, that change is compared with the preselected threshold value $\Delta i_{th}$ and, if the measured change Δi exceeds the threshold value $\Delta i_{th}$, the current i is immediately adjusted to stop or reverse the motor. The effect of this system is to monitor the first derivative (the instantaneous rate of change) of the motor current i with respect to time, to monitor the magnitude and polarity of that first derivative, and to detect positive changes of magnitude that exceed a preselected threshold.

The algorithm shown in FIG. 1 can be implemented with a pair of integrated circuits, such as a MC33887 H-Bridge Power IC (available from Freescale Semiconductor, Inc. in Chandler, Ariz.) and a programmable microcontroller such as a PIC18F2420 (available from Microchip Technology Inc. in Chandler, Ariz.). The bridge circuit provides DC current to drive a DC motor, and also produces a feedback signal that is proportional to the motor drive current and can be "read" by a microcontroller having an analog-to-digital converter. The microcontroller can be programmed to filter this feedback signal to remove the commutation ripples, and then calculate any change that occurs in the magnitude of the filtered current in successive time intervals Δt. The microcontroller can also be programmed to determine whether each calculated change is a positive change, whether each positive change exceeds a prescribed threshold value and, if so, to produce a control signal that causes the bridge circuit to zero, or reverse the polarity of, the motor terminal voltage.

Figure 2:
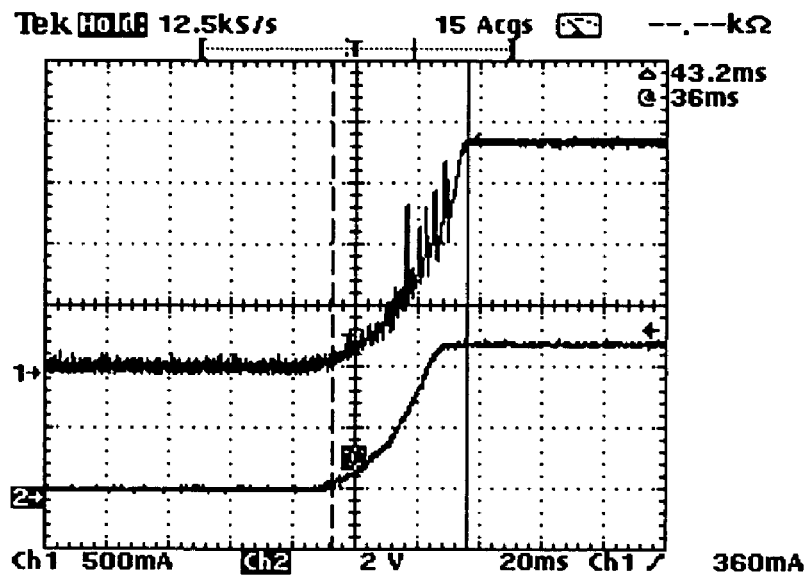
FIG. 2 is a plot of current supplied to a DC motor with a gearbox that has run into an end stop at full operational speed without the shock protection system of the present invention.

FIG. 2 is a plot of the current from a DC motor with a gearbox that has run into an end stop at full operational speed. Trace A shows the raw motor current, and trace B shows the motor current that has been low-pass filtered to remove the commutation ripple, digitized at 5V/1A, and limited to 1A. Both traces A and B show the uncontrolled current rise from the full operational speed level to the locked rotor level. The rise time of 43 ms is the time it takes to compress the elastic portion of the motor coupling to the device.

Figure 3:
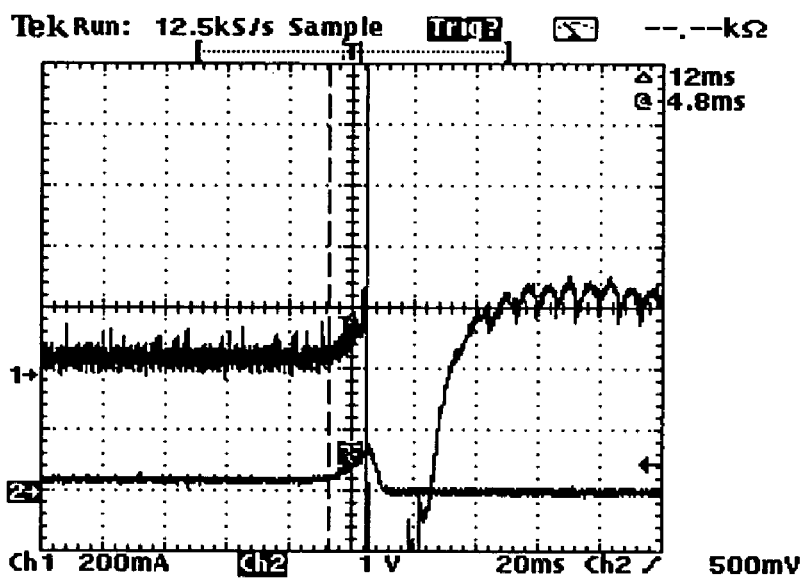
FIG. 3 is a plot of current supplied to a DC motor having the shock protection system of the present invention.

FIG. 3 is a plot of the current from the same DC motor equipped with the mechanical shock prevetion system. The vertical scale in FIG. 3 is twice that of FIG. 2. Trace C in FIG. 3 shows the controlled current rise using the shock protection system. The change in current exceeds the allowable threshold 12 ms after the rise begins, and the motor is stopped long before the elastic portion of the motor coupling to the device is fully compressed.

One example of an application in which the mechanical shock protection system of this invention is useful is in transfer switches, which are used to connect an electrical load to one of typically two separate power sources. A transfer switch connects a load to only one of the sources at a time using one switch per source, and a DC-motor-driven actuator opens and closes the switches, as described in U.S. Patent Application Publication No. 2006/0131146, which is incorporated herein by reference.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of controlling the torque produced by a DC motor having a rotor to protect a mechanical system driven by said motor, said mechanical system comprising a combination of gears, levers, cams and/or sliding components arranged for interactive movement and having a particular elasticity in that movement and a limit at which compression of said particular elasticity by said motor torque can damage said mechanical system, said method comprising:

monitoring that portion of the motor torque produced by rotor inertia by sampling an electrical current supplied to said motor, filtering said sampled current to substantially remove commutation ripples, and establishing a first derivative of said filtered sample of said electrical current, said first derivative current representing an inertial torque applied to said system by said rotor; and adjusting said electrical current supplied to said motor to stop or reverse said motor in response to an increase in said rotor inertia torque that exceeds a preselected threshold value selected to protect said mechanical system from damage caused by compression of said mechanical system that exceeds said particular elasticity.

2. The method of claim 1 wherein said monitoring includes detecting increases in said first derivative of said filtered sample of said electrical current in selected time intervals.

3. The method of claim 1 wherein said threshold is significantly above the increases that occur in said rotor inertia torque during normal operation of the motor and well below locked rotor motor torque.

4. The method of claim 1 wherein said monitoring includes calculating any change that occurs in the magnitude of said first derivative of said filtered sample of said electrical current supplied to said motor in selected time intervals, and determining whether each calculated change is positive.

5. A method of protecting a mechanical system of gears, levers, cams and/or sliding components arranged for interactive movement when driven by a DC motor, said system having a particular elasticity in that movement and a limit at which compression of said particular elasticity by said motor can damage said mechanical system, said method comprising:

sampling the electrical current supplied to said motor, filtering said sample to substantially remove commutation ripples, taking a first derivative of said sample, detecting increases in said first derivative sample in selected time intervals, comparing each of said detected increases with a preselected threshold, and stopping and/or reversing said motor in response to any said detected increase that exceeds said preselected threshold to protect said mechanical system.

6. The method of claim 5 wherein said selected time intervals are successive intervals of equal length.

7. The method of claim 5 wherein said threshold is significantly above the increases that occur in said first derivative sample during normal operation of the motor and below said limit at which compression of said particular elasticity can damage said mechanical system.

8. The method of claim 5 includes calculating any change that occurs in the magnitude of said first derivative sample and determining whether each calculated change is positive.

9. The method of claim 5 in which said motor actuates a transfer switch.

10. A method of controlling the torque produced by a DC motor to protect a mechanical system of gears, levers, cams and/or sliding components arranged for interactive movement when driven by said motor, said system having a particular elasticity in that movement and a limit at which compression of said particular elasticity by said motor torque. can damage said mechanical system, said method comprising:

monitoring the first derivative of the electrical current supplied to said motor, and adjusting the electrical current to stop and/or reverse said motor in response to a positive increase in said first derivative that exceeds a preselected threshold during a selected time interval to protect said mechanical system.

11. The method of claim 10 wherein said monitoring includes sampling said electrical current supplied to said motor, and filtering said sample to substantially remove commutation ripples.

12. The method of claim 10 wherein said threshold is significantly above the increases that occur in said torque during normal operation of the motor and less than said limit at which compression of said particular elasticity can damage said mechanical system.

* * * * *